Dec. 4, 1956  R. B. CAMPBELL  2,772,900
SEALING DEVICE
Filed Jan. 2, 1953
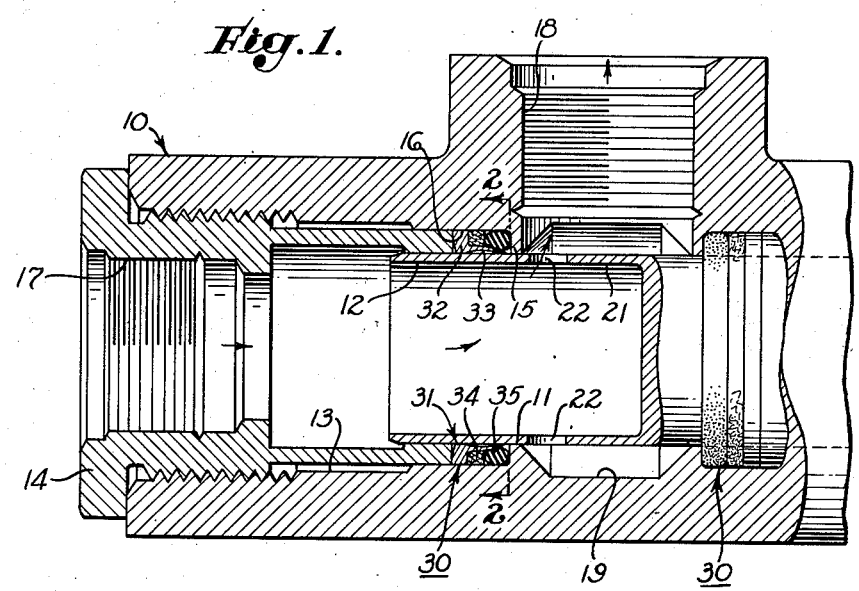
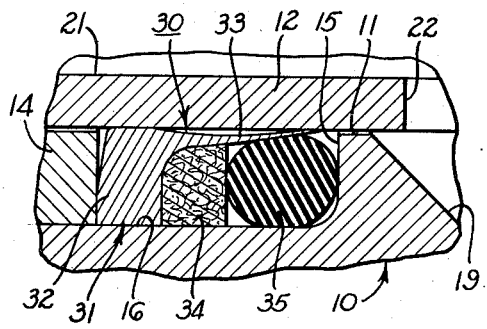
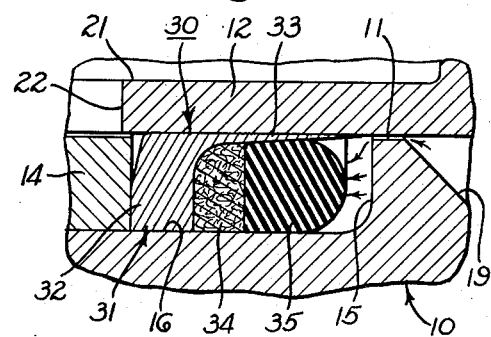
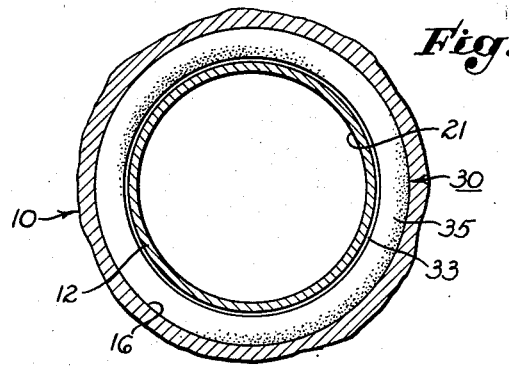
INVENTOR.
RODNEY B. CAMPBELL
BY HIS ATTORNEYS.
HARRIS, KIECH, FOSTER & HARRIS

United States Patent Office 2,772,900
Patented Dec. 4, 1956.

2,772,900

SEALING DEVICE

Rodney B. Campbell, Glendale, Calif., assignor, by mesne assignments, to Wm. R. Whittaker Co., Ltd., Los Angeles, Calif., a corporation of California Application January 2, 1953, Serial No. 329,385

3 Claims. (Cl. 286—26)

The present invention relates to a device for providing a fluid-tight seal between two relatively slidable members, such as a piston and cylinder, the sealing device of the invention being disposed in a groove in one of the relatively slidable members. For example, the sealing device of the invention may be disposed in an annular groove in the wall of a cylinder so as to be engageable with a piston reciprocable in the cylinder, although the sealing device may be disposed in an annular groove in the piston and be engageable with the wall of the cylinder as well. A construction wherein the cylinder is grooved to receive the sealing device of the invention will be considered herein for convenience.

A primary object of the invention is to provide a sealing device which includes a sealing element, preferably of metal, disposed in the groove and having a flexible annular flange one side of which is adapted to engage the piston in a fluid-tight manner, means being provided to deflect the flange into sealing engagement with the piston.

An important obejct is to provide a sealing device wherein the means for deflecting the flexible flange into sealing engagement with a piston comprises a distortable, annular packing element which is disposed in the groove and which is engageable with the bottom of the groove and with the flexible flange, the packing element being distortable by the application of fluid pressure thereto so that it deflects the flexible flange into sealing engagement with the piston. Preferably, the packing element is formed of a rubber-like material and may be a conventional O-ring.

An important object is to make that side of the flexible flange which is engageable with the piston concave so that it 'oil cans" into sealing engagement with the piston upon application of sufficient fluid pressure to the packing element to produce the necessary distortion thereof, the flexible flange resuming its original concave configuration upon relaxation of the fluid pressure applied to the packing element.

Another object is to provide a backing element in the groove between the bottom of the groove and the flexible flange of the sealing element and between the packing element and an annular base of the sealing element which carries the flexible flange thereof.

The foregoing objects and advantages of the present invention, together with various other objects and advantages thereof which will become apparent, may be attained with the exemplary embodiment of the invention which is illustrated in the accompanying drawing and which is described in detail hereinafter. Referring to the drawing:

Fig. 1 is a sectional view of a piston valve incorporating the sealing device of the invention;

Fig. 2 is a transverse sectional view taken along the arrowed line 2—2 of Fig. 1; and Figs. 3 and 4 are fragmentary sectional views on an enlarged scale duplicating a portion of Fig. 1 and illustrating the operation of the sealing device of the invention.

It will be understood that, in showing the sealing device of the invention incorporated in a piston valve, there is no intention of limiting the sealing device of the invention to such use since it is susceptible of many other applications, the use of the sealing device of the invention in a piston valve being illustrative only.

In the drawing, the numeral 10 designates a valve body which provides a cylinder 11 having therein a piston or piston member 12, the latter being reciprocable in the cylinder 11. The cylinder 11 is counterbored at 13 to receive a tubular plug 14 which provides an extension of the cylinder, the inner end of the plug 14 being spaced from a shoulder 15 at the junction of the cylinder 11 and the counterbore 13 to provide, in effect, an annular groove 16 in the cylinder 11. The plug 14 provides a threaded inlet port 17, an outlet port 18 being formed in the valve body 10 and communicating with an annular channel 19 which communicates with and encircles the cylinder 11. The piston 12 is provided with a bore 21 therein which communicates with the port 17 and is provided with radial ports 22 which communicate with the annular channel 19 when the piston 12 is in the position shown in Fig. 1. When the piston 12 is in its closed position, the ports 22 are disposed to the left of the annular groove 16, which contains the sealing device of the invention, as hereinafter described.

The sealing device of the invention is designated generally by the numeral 30 and is disposed in the annular groove 16 in the cylinder 11 so that it is engageable with the walls of the groove and with the piston 12 to provide a fluid-tight seal between the cylinder and the piston, thereby preventing leakage when the valve is closed. The sealing device 30 includes an annular sealing element 31, preferably of metal, which includes an annular base 32 and a flexible annular flange or sleeve 33 formed integrally with and extending axially from the base. The sealing element 31 is machined to fit closely around the piston 12, one edge of the base 32 and one side of the flange 33 being engageable with the piston. The opposite edge of the base 32 engages the bottom of the groove 16, and one side of the base 32 engages one side of the groove. The side of the flange 33 which is engageable with the piston 12 is normally concave so that, when sufficient force is applied to the opposite side thereof, it snaps or "oil cans" into engagement with the piston, being flattened against the piston under such conditions, as best shown in Fig. 4. The sealing device 30 also includes an annular backing element 34 of leather, or other suitable material, which encircles the flange 33 and which is disposed between it and the bottom of the annular groove 16, the backing element 34 being engageable with the base 32 of the sealing element. Also encircling the flange 33 is an annular packing element 35 of a rubber-like material, the packing element being engageable with the backing element 34. The packing element 35 may be an ordinary O-ring, for example.

Considering the operation of the sealing device 30, when no pressure is applied to the packing element 35, this element is undistorted and the side of the flange 33 in engagement with the piston 12 is concave, as shown in Fig. 3. However, when pressure is applied to the packing element 35, as when the piston 12 is in its closed position, the packing element is distorted, as shown in Fig. 4. This distortion is in the axial direction and results in radial expansion of the packing element 35 to deflect the flexible flange 33 into positive sealing engagement with the piston 12, the flange 33 being in effect flattened against the piston. The flange 33 deflects into its flattened position with a snap action, or with what might be termed an "oil can" effect, this occurring when sufficient pressure is applied to the packing element 35 to produce a predetermined radial enlargement thereof.

When the pressure distorting the packing element 35 is reduced below a predetermined value, the inherent resilience of the sealing element 35 causes the flange 33 to "oil can" back into its original position wherein the side thereof in engagement with the piston 12 is again concave.

It will be noted that the O-ring or other packing element 35 thus performs two functions in the sealing device 30. First, the outer periphery of the O-ring provides a seal relative to the bottom of the groove 16 and the inner periphery thereof provides a seal against the flange 33. Secondly, it, when distorted, provides the force necessary to deflect the flange 33 into sealing engagement with the piston 12.

Although I have disclosed an exemplary embodiment of the invention herein, it will be understood that various minor changes, modifications and substitutions may be made in such embodiment without departing from the spirit of the invention.

I claim as my invention:

1. In combination: two relatively slidable members one having therein a groove which faces the other of said members and which extends transversely of the direction of relative sliding movement of said members, said groove having bottom and side walls; a sealing element of substantially L-shaped cross section disposed in said groove, said sealing element having a rigid base which engages the bottom wall and a side wall of said groove and having a flexible, resilient flange provided with a concave side which faces and engages said other member, said base and said flange including substantially a right angle therebetween and providing a recess therebetween; and a compressible packing element in said recess and engaging the other side of said flange and the bottom wall of said groove, said packing element being compressible toward said base under pressure existing between said members so as to expand transversely of said direction to deflect said concave side of said flange into sealing engagement with said other member and to flatten said concave side of said flange against said other member.

2. In combination: a piston member axially slidable in a cylinder member, one of said members having an annular groove therein which faces the other of said members and which is defined by bottom and side walls; an annular sealing element of substantially L-shaped cross section disposed in said groove, said sealing element having a rigid annular base which engages the bottom wall and a side wall of said groove and having a flexible, resilient, annular flange extending axially from said base and provided with a concave side which faces and engages said other member, said base and said flange including substantially a right angle therebetween and providing an annular recess therebetween; and a compressible, annular packing element in said recess and engaging the other side of said flange and the bottom wall of said groove, said packing element being axially compressible toward said base under pressure so as to expand radially to deflect said concave side of said flange into sealing engagement with said other member and to flatten said concave side of said flange against said other member.

3. A combination as defined in claim 2 including an annular backing element in said recess and engaging said packing element and said base, said backing element also engaging the bottom wall of said groove and said other side of said flange.

References Cited in the file of this patent

UNITED STATES PATENTS

| | | |
|---|---|---|
| 613,041 | Kamerer | Oct. 25, 1898 |
| 1,205,887 | Guttner | Nov. 21, 1916 |
| 1,347,351 | Murray et al. | July 20, 1920 |
| 1,438,527 | Holmes | Dec. 12, 1922 |
| 2,402,114 | Le Clair | June 11, 1946 |
| 2,427,787 | Hunter | Sept. 23, 1947 |

FOREIGN PATENTS

| | | |
|---|---|---|
| 224,101 | Great Britain | Nov. 6, 1924 |
| 477,462 | Canada | Oct. 2, 1951 |
| 567,346 | Great Britain | Feb. 9, 1945 |
| 988,042 | France | Apr. 25, 1951 |